(12) United States Patent
Lim et al.

(10) Patent No.: US 12,731,839 B2
(45) Date of Patent: Sep. 8, 2026

(54) BATTERY CELL, METHOD FOR MANUFACTURING THE SAME, AND BATTERY MODULE INCLUDING THE SAME

(71) Applicant: LG Energy Solution, Ltd., Seoul (KR)

(72) Inventors: Hun-Hee Lim, Daejeon (KR); Sang-Hun Kim, Daejeon (KR); Min-Hyeong Kang, Daejeon (KR); Hyung-Kyun Yu, Daejeon (KR); Soo-Ji Hwang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 781 days.

(21) Appl. No.: 17/920,971

(22) PCT Filed: Feb. 25, 2022

(86) PCT No.: PCT/KR2022/002829
§ 371 (c)(1),
(2) Date: Oct. 24, 2022

(87) PCT Pub. No.: WO2022/182210
PCT Pub. Date: Sep. 1, 2022

(65) Prior Publication Data
US 2023/0170564 A1 Jun. 1, 2023

(30) Foreign Application Priority Data
Feb. 25, 2021 (KR) ........................ 10-2021-0025910

(51) Int. Cl.
*H01M 50/186* (2021.01)
*H01M 50/105* (2021.01)
(Continued)

(52) U.S. Cl.
CPC ....... *H01M 50/186* (2021.01); *H01M 50/105* (2021.01); *H01M 50/121* (2021.01);
(Continued)

(58) Field of Classification Search
CPC .. H01M 50/186; H01M 50/24; H01M 50/131; H01M 50/121
See application file for complete search history.

(56) References Cited

U.S. PATENT DOCUMENTS

2007/0184345 A1* 8/2007 Neudecker ........ H01M 10/0436 429/176
2008/0003493 A1* 1/2008 Bates ................ H01M 10/0562 429/185
(Continued)

FOREIGN PATENT DOCUMENTS

JP 2005038707 A 2/2005
JP 2006107894 A 4/2006
(Continued)

OTHER PUBLICATIONS

Extended European Search Report including Written Opinion for Application No. 22760126.7 dated Oct. 18, 2024. 7 pgs.
(Continued)

*Primary Examiner* — Kenneth J Douyette
(74) *Attorney, Agent, or Firm* — Lerner David LLP

(57) ABSTRACT

Disclosed is a battery cell, which includes a battery case having an accommodation portion in which an electrode assembly is positioned, and a sealing portion formed by sealing an outer periphery of the battery case, an electrode lead electrically connected to an electrode tab included in the electrode assembly, the electrode lead protruding out of the battery case through the sealing portion, a lead film located on at least one of a first portion and a second portion of the electrode lead, the lead film adjacent to the sealing portion, and a getter unit positioned between the electrode lead and the sealing portion. The getter unit includes a first end positioned outside of the battery case and a second end
(Continued)

positioned inside of the battery case. The first end is covered by the lead film and not covered by the sealing portion.

19 Claims, 5 Drawing Sheets

(51) Int. Cl.
*H01M 50/121* (2021.01)
*H01M 50/131* (2021.01)
*H01M 50/24* (2021.01)
*H01M 50/538* (2021.01)

(52) U.S. Cl.
CPC ......... *H01M 50/131* (2021.01); *H01M 50/24* (2021.01); *H01M 50/538* (2021.01)

(56) References Cited

U.S. PATENT DOCUMENTS

2008/0206636 A1 8/2008 Sanada et al.
2015/0125721 A1 5/2015 Yoon
2018/0114964 A1 4/2018 Kim et al.
2018/0248235 A1 8/2018 Kim et al.
2019/0036180 A1 1/2019 Downie et al.

FOREIGN PATENT DOCUMENTS

| | | | |
|---|---|---|---|
| JP | 2008235256 | A | 10/2008 |
| JP | 2011108433 | A | 6/2011 |
| JP | 2014212034 | A | 11/2014 |
| JP | 2015195191 | A | 11/2015 |
| JP | 2021096952 | A | 6/2021 |
| JP | 2022061268 | A | 4/2022 |
| KR | 20010047187 | A | 6/2001 |
| KR | 20150051142 | A | 5/2015 |
| KR | 20160134331 | A | 11/2016 |
| KR | 20170068730 | A | 6/2017 |
| KR | 2018-0022651 | A | 3/2018 |
| KR | 101904587 | B1 | 10/2018 |

OTHER PUBLICATIONS

International Search Report for Application No. PCT/KR2022/002829 mailed Jun. 17, 2022, pp. 1-3.

* cited by examiner

BATTERY CELL, METHOD FOR MANUFACTURING THE SAME, AND BATTERY MODULE INCLUDING THE SAME

CROSS-REFERENCE TO RELATED APPLICATIONS

The present application is a national phase entry under 35 U.S.C. § 371 of International Application No. PCT/KR2022/002829, filed on Feb. 25, 2022, which claims priority from Korean Patent Application No. 10-2021-0025910 filed on Feb. 25, 2021 in the Republic of Korea, the disclosures of which are incorporated herein by reference.

TECHNICAL FIELD

The present disclosure relates to a battery cell, a method for manufacturing the same, and a battery module including the same, and more particularly, to a battery cell capable of discharging the gas generated inside the battery cell to the outside while minimizing the penetration of moisture from the outside, a method for manufacturing the same, and a battery module including the same.

BACKGROUND ART

As technology development and demand for mobile devices increase, the demand for secondary batteries as an energy source is rapidly increasing. In particular, secondary batteries are of great interest as energy sources not only for mobile devices such as mobile phones, digital cameras, notebooks and wearable devices, but also for power devices such as electric bicycles, electric vehicles and hybrid electric vehicles.

Depending on the shape of a battery case, these secondary batteries are classified into a cylindrical battery and a prismatic battery in which a battery assembly is included in a cylindrical or prismatic metal can, and a pouch-type battery in which the battery assembly is included in a pouch-type case of an aluminum laminate sheet. Here, the battery assembly included in the battery case is a power element including a positive electrode, a negative electrode, and a separator interposed between the positive electrode and the negative electrode, and capable of charging and discharging, and is classified into a jelly-roll type in which long sheet-type positive and negative electrodes coated with an active material are wound with a separator being interposed therebetween, and a stack type in which a plurality of positive and negative electrodes are sequentially stacked with a separator being interposed therebetween.

Among them, in particular, a pouch-type battery in which a stack-type or stack/folding-type battery assembly is included in a pouch-type battery case made of an aluminum laminate sheet is being used more and more due to low manufacturing cost, small weight, and easy modification.

FIG. 1 is a top view showing a conventional battery cell. FIG. 2 is a cross-sectional view, taken along the axis a-a' of FIG. 1. Referring to FIGS. 1 and 2, a conventional battery cell 10 includes a battery case 20 having an accommodation portion 21 in which a battery assembly 11 is mounted, and a sealing portion 25 formed by sealing an outer periphery thereof by heat fusion. Here, the battery cell 10 includes an electrode lead 30 protruding out of the battery case 20 via the sealing portion 25, and a lead film 40 is located between upper and lower portions of the electrode lead 30 and the sealing portion 25.

However, as the energy density of the battery cell increases in recent years, there is a problem that the amount of gas generated inside the battery cell also increases. In the case of the conventional battery cell 10, a component capable of discharging the gas generated inside the battery cell is not included, so a venting may occur in the battery cell due to gas generation. In addition, moisture may penetrate into the battery cell damaged by the venting, which may cause side reactions, and there is a problem that battery performance deteriorates and additional gas is generated. Accordingly, there is an increasing need to develop a battery cell capable of discharging the gas generated inside the battery cell to the outside while minimizing the penetration of moisture from the outside.

DISCLOSURE

Technical Problem

The present disclosure is designed to solve the problems of the related art, and therefore the present disclosure is directed to providing a battery cell capable of discharging the gas generated inside the battery cell to the outside while minimizing the penetration of moisture from the outside, a method for manufacturing the same, and a battery module including the same.

The object to be solved by the present disclosure is not limited to the above-mentioned object, and the objects not mentioned here may be clearly understood by those skilled in the art from this specification and the accompanying drawings.

Technical Solution

In one aspect of the present disclosure, there is provided a battery cell, comprising: a battery case having an accommodation portion in which an electrode assembly is mounted, and a sealing portion formed by sealing an outer periphery thereof; an electrode lead electrically connected to an electrode tab included in the electrode assembly and protruding out of the battery case via the sealing portion; a lead film located at a portion corresponding to the sealing portion in at least one of an upper portion and a lower portion of the electrode lead; and a getter unit formed in a partial region between the electrode lead and the sealing portion, wherein the getter unit includes a first end directed toward an outside of the battery case and a second end directed toward an inside of the battery case, and the first end is covered by the lead film and not covered by the sealing portion.

The second end may not be covered by the lead film and may not overlap with the sealing portion.

The getter unit may be formed directly on the electrode lead, and the lead film may be disposed on the electrode lead with the getter unit interposed therebetween.

The lead film located on the getter unit may have a thickness of 100 μm to 300 μm.

The lead film may include a first lead film in direct contact with the electrode lead and a second lead film disposed on the first lead film with the getter unit interposed therebetween.

The second lead film may have a thickness of 100 μm to 300 μm.

The getter unit may include at least one moisture-absorbing material selected from calcium oxide (CaO), barium oxide (BaO), lithium chloride (LiCl), calcium (Ca) and barium (Ba).

The getter unit may contain a binder material including at least one selected from polyolefin-based polymers, acryl-based polymers and fluorine-based polymers.

The lead film may contain a polyolefin-based material.

The lead film may be configured to surround all of an upper portion of the electrode lead, a lower portion of the electrode lead, and a side surface connecting the upper portion and the lower portion of the electrode lead.

The getter unit may have a thickness of 50 μm to 150 μm.

The getter unit may have gas permeability of 1.6 $e^5$ Barrer to 1.6 $e^7$ Barrer.

An area of the first end of the getter unit exposed at an outer side of the sealing portion may be greater than an area of the second end of the getter unit exposed at an inner side of the sealing portion.

A width between the first end and an outermost end of the lead film may be 2 mm or more.

The lead film may have gas permeability of 20 Barrer to 60 Barrer at 60° C.

The lead film may have a moisture penetration amount of 0.02 g to 0.2 g for 10 years at 25° C., 50% RH.

In another aspect of the present disclosure, there is also provided a method for manufacturing a battery cell, comprising: preparing an electrode assembly and an electrode lead electrically connected to an electrode tab included in the electrode assembly; mounting the electrode assembly in an accommodation portion of a battery case so that the electrode lead protrudes in an outer direction of the battery case; and sealing an outer periphery of the battery case to form a sealing portion, wherein the step of preparing an electrode assembly includes: attaching a lead film to the electrode lead to be located in a region corresponding to the sealing portion in at least one of an upper portion and a lower portion of the electrode lead, and coating a getter resin on the electrode lead to form a getter unit, wherein the getter unit includes a first end directed toward an outside of the battery case and a second end directed toward an inside of the battery case, and wherein the first end is covered by the lead film and not covered by the sealing portion.

The getter resin may include at least one moisture-absorbing material selected from calcium oxide (CaO), barium oxide (BaO), lithium chloride (LiCl), calcium (Ca) and barium (Ba); and a binder material including at least one selected from polyolefin-based polymers, acryl-based polymers and fluorine-based polymers.

The second end may not be covered by the lead film and may not overlap with the sealing portion.

In still another aspect of the present disclosure, there is also provided a battery module, comprising the battery cell described above.

Advantageous Effects

According to the embodiments, the present disclosure provides a battery cell capable of discharging the gas generated inside the battery cell to the outside while minimizing the penetration of moisture from the outside, a method for manufacturing the same, and a battery module including the same, so it is possible to discharge the gas generated inside the battery cell to the outside while minimizing the penetration of moisture from the outside.

The effect of the present disclosure is not limited to the above effects, and the effects not mentioned here will be clearly understood by those skilled in the art from this specification and the accompanying drawings.

BEST MODE

Figure 1:
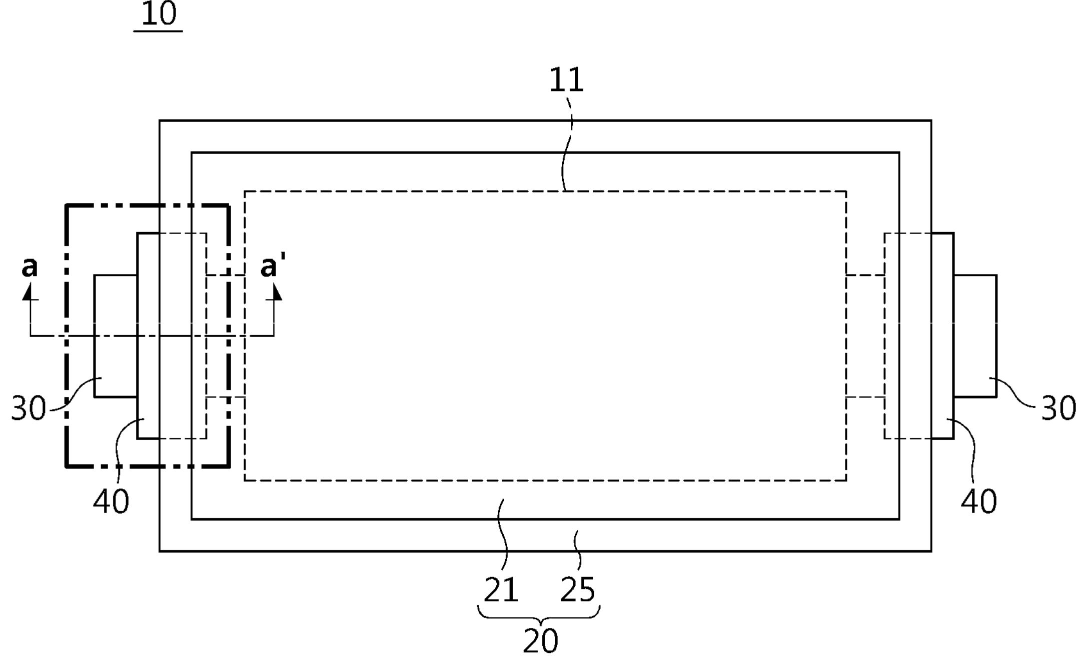
FIG. 1 is a top view showing a conventional battery cell.
Figure 2:
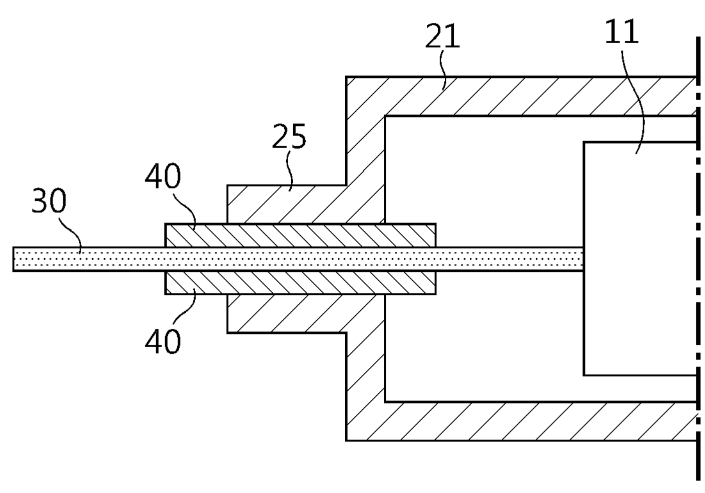
FIG. 2 is a cross-sectional view, taken along the axis a-a' of FIG. 1.

Hereinafter, with reference to the accompanying drawings, various embodiments of the present disclosure will be described in detail so as to be easily implemented by those skilled in the art. The present disclosure may be implemented in various different forms and is not limited to the embodiments described herein.

In order to clearly explain the present disclosure, parts irrelevant to the description are omitted, and identical or similar components are endowed with the same reference signs throughout the specification.

In addition, since the size and thickness of each component shown in the drawings are arbitrarily expressed for convenience of description, the present disclosure is not necessarily limited to the drawings. In order to clearly express various layers and regions in the drawings, the thicknesses are enlarged. Also, in the drawings, for convenience of explanation, the thickness of some layers and regions is exaggerated.

In addition, throughout the specification, when a part "includes" a certain component, it means that other components may be further included, rather than excluding other components, unless otherwise stated.

In addition, throughout the specification, when referring to "top view", it means that the target part is viewed from above, and when referring to "cross-sectional view", it means that a vertically-cut section of the target part is viewed from a side.

Hereinafter, a pouch battery cell 100 according to an embodiment of the present disclosure will be described with reference to FIGS. 3 to 5. However, here, the description will be made based on one side surface of both side surfaces of the pouch battery cell 100, but it is not necessarily limited thereto, and the same or similar contents may be described in the case of the other side surface.

Figure 3:
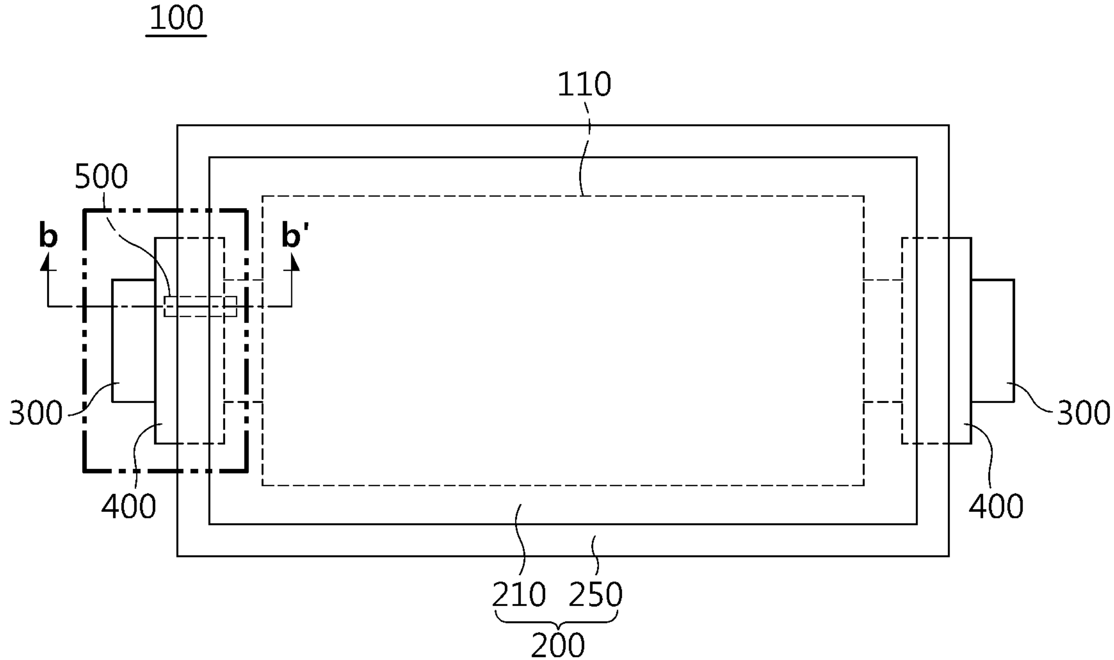
FIG. 3 is a top view showing a battery cell according to an embodiment of the present disclosure.

FIG. 3 is a top view showing a battery cell according to an embodiment of the present disclosure. FIG. 4 is a cross-sectional view, taken along the axis b-b' of FIG. 3. FIGS. 5*a* to 5*e* are partial top views showing battery cells according to modified examples of an embodiment of the present disclosure.

Referring to FIG. 3, the battery cell 100 according to this embodiment includes a battery case 200, an electrode lead 300, and a lead film 400.

The battery case 200 includes an accommodation portion 210 in which an electrode assembly 110 is mounted, and a sealing portion 250 formed by sealing an outer periphery thereof. The sealing portion 250 may be sealed by heat, laser, or the like. The battery case 200 may be a laminate sheet including a resin layer and a metal layer. More specifically, the battery case 200 may be made of a laminate sheet, and may include an outer resin layer forming the outermost layer, a barrier metal layer preventing penetration of materials, and an inner resin layer for sealing.

Also, the electrode assembly 110 may have a structure of a jelly-roll type (winding type), a stack type (lamination type), or a composite type (stack/folding type). More specifically, the electrode assembly 110 may include a positive electrode, a negative electrode, and a separator disposed therebetween.

The electrode lead 300 is electrically connected to an electrode tab (not shown) included in the electrode assembly 110, and protrudes out of the battery case 200 via the sealing portion 250. In addition, the lead film 400 is located at a portion corresponding to the sealing portion 250 in at least one of an upper portion and a lower portion of the electrode lead 300. Accordingly, the lead film 400 may improve the sealing properties of the sealing portion 250 and the electrode lead 300 while preventing a short circuit from occurring in the electrode lead 300 during thermal fusion.

A getter unit (or part) 500 is formed in at least a partial region on the electrode lead 300. The getter unit 500 may be formed in a region between the electrode lead 300 and the sealing portion 250. The getter unit 500 includes a first end 510 directed toward the outside of the battery case 200 and a second end 520 directed toward the inside of the battery case 200. At this time, the first end 510 is covered by the lead film 400, and is simultaneously configured to be exposed without being covered by the sealing portion 250. Accordingly, the gas generated inside the battery cell may be discharged to the outside through the first end 510.

In addition, the second end 520 may be located inside the battery case 200 (i.e., covered by the battery case 200), and be configured not to be covered by the lead film 400 and not to overlap with the sealing portion 250. Accordingly, the gas generated inside the battery cell may pass through the getter unit 500 through the second end 520 and be discharged to the outside through the portion not covered by the sealing portion 250, namely through the first end 510.

In one embodiment of the present disclosure, the gas permeability of the getter unit 500 may be 1.6 $e^5$ Barrer to 1.6 $e^7$ Barrer, or 1 $e^6$ Barrer to 3 $e^6$ Barrer. For example, the carbon dioxide permeability of the getter unit 500 may satisfy the above range.

In one embodiment of the present disclosure, the getter unit 500 may have a thickness of 50 μm to 150 μm. If the thickness of the getter unit 500 satisfies the above range, the gas inside the battery case 200 may be more easily discharged to the outside.

The getter unit 500 may be made of a material having a higher melting point compared to the material of the lead film 400. In addition, the getter unit 500 may be made of a material that does not react to the electrolyte contained in the battery case 200. For example, the getter unit 500 may include a binder having at least one of olefin-based resins, acryl-based resins, and fluorine-based resins. The olefin-based resin may include at least one material selected from the group consisting of polypropylene, polyethylene, and polyvinyldifluoride (PVDF). The fluorine-based resin may include at least one material selected from the group consisting of polytetrafluoroethylene and polyvinylidene fluoride.

In addition, the getter unit 500 includes a moisture-absorbing material to increase gas permeability but minimize moisture permeability. For example, the moisture-absorbing material may be calcium oxide (CaO), barium oxide (BaO), lithium chloride (LiCl), silica ($SiO_2$), calcium (Ca), barium (Ba), or the like, but is not limited thereto. Any material that reacts with water ($H_2O$) may be used. By configuring the getter unit 500 in this way, even if moisture is penetrated through a portion of the lead film 400 not covered by the battery case 200, especially by the sealing portion 250, the moisture is removed by reacting with the moisture-absorbing material of the getter unit 500, so it is possible to prevent moisture from penetrating into the battery case 200.

Moreover, the getter unit 500 may be formed by coating a getter resin containing the above binder and/or the moisture-absorbing material on the electrode lead 300 by a known coating method. For example, the getter unit 500 may be formed by a coating method such as inkjet printing, spray coating, spin coating, or blade coating. Thereby, the getter unit 500 may be formed to be variously transformed into a desired shape, and the getter unit 500 may be easily formed by forming the getter unit 500 through coating on the electrode lead 300 and then coupling the getter unit 500 when sealing the battery case 200.

Figure 4:
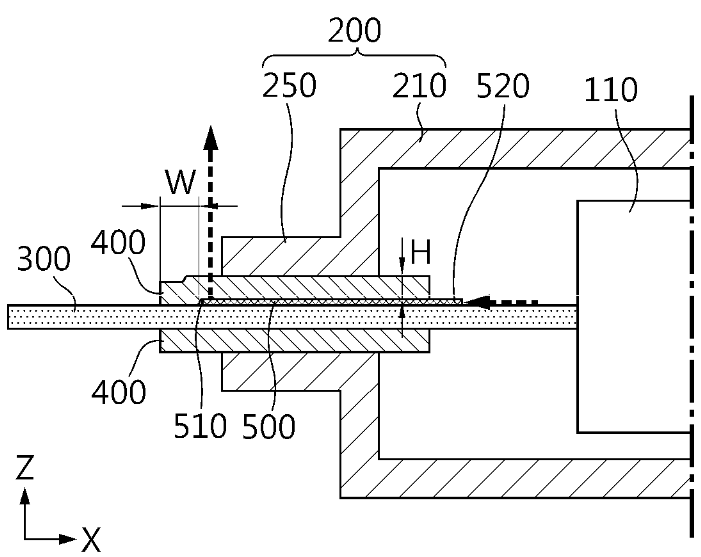
FIG. 4 is a cross-sectional view, taken along the axis b-b' of FIG. 3.

Referring to FIG. 4, the gas introduced into the getter unit 500 may be discharged along the Z-axis direction through the lead film 400 on the first end of the getter unit 500.

In one embodiment of the present disclosure, the area of the first end of the getter unit 500 exposed at the outer side of the sealing portion 250 may be greater than the area of the second end of the getter unit 500 exposed at the inner side of the sealing portion 250. The gas discharge amount is proportional to the gas discharge area and pressure. Since the pressure inside the battery case 200 is greater than the pressure outside the battery case 200, if the area of the first end exposed at the outer side of the sealing portion 250 is greater than the area of the second end exposed at the inner side of the sealing portion 250, the gas generated inside the battery case 200 may be more easily discharged to the outside. Here, the "outer side of the sealing portion" refers to a region of the battery case located outward of the end of the sealing portion in the outer direction of the battery case, and the "inner side of the sealing portion" refers to a region of the battery case located inward of the end of the sealing portion in the inner direction of the battery case.

In one embodiment of the present disclosure, the area of the first end exposed at the outer side of the sealing portion 250 may be 40 $mm^2$ to 80 $mm^2$. This is a size in which about 0.5 cc to 3 cc of gas can be discharged per day based on an internal pressure of 1 atm at 60° C. In addition, this is a size in which the moisture penetration amount may be 0.02 g to 0.2 g for 10 years at 25° C., 50% RH.

Referring to FIG. 4, the thickness H of the lead film 400 located on the getter unit 500 may be 100 μm to 300 μm, or 100 μm to 200 μm. If the thickness H of the lead film 400 located on the getter unit 500 satisfies the above range, the gas inside the battery case 200 may be more easily discharged to the outside.

Referring to FIG. 4, the width W between the first end and the outermost end of the lead film may be 2 mm or more, or 2 mm to 3 mm. If the width W between the first end and the outermost end of the lead film satisfies the above range, it will be easier to prevent the lead film 400 from being torn in the process of discharging the gas generated inside the battery case 200 to the outside.

Meanwhile, the lead film 400 may be located at an upper portion of the electrode lead 300 and a lower portion of the electrode lead 300, and may be formed to connect the upper portion and the lower portion to cover the side surface of the electrode lead 300 entirely. Accordingly, the lead film 400 may prevent the side surface of the electrode lead 300 from being exposed to the outside, while improving the sealing property of the sealing portion 250 and the electrode lead 300.

In one embodiment of the present disclosure, the gas permeability of the lead film 400 may be 20 Barrer to 60 Barrer, or 30 Barrer to 40 Barrer at 60° C. For example, the carbon dioxide permeability of the lead film 400 may satisfy the above range. In addition, the gas permeability may satisfy the above range at 60° C. based on the thickness of the lead film 400 of 200 μm. If the gas permeability of the lead film 400 satisfies the above range, the gas generated inside the battery cell may be more effectively discharged.

In this specification, the gas permeability may be measured by ASTM F2476-20.

In one embodiment of the present disclosure, the moisture penetration amount of the lead film 400 may be 0.02 g to 0.2 g, or 0.02 g to 0.04 g, or 0.06 g, or 0.15 g for 10 years at 25° C., 50% RH. If the moisture penetration amount of the lead film 400 satisfies the above range, the penetration of moisture from the lead film 400 may be more effectively prevented.

The moisture penetration amount of the lead film 400 may be measured by adopting the ASTM F 1249 method. At this time, the moisture penetration amount may be measured using equipment officially certified by MCOON.

In one embodiment of the present disclosure, the lead film 400 may have a gas permeability of 20 Barrer to 60 Barrer at 60° C. and a moisture penetration amount of 0.02 g to 0.2 g at 25° C., 50% RH for 10 years. If the gas permeability and the moisture penetration amount of the lead film 400 satisfy the above ranges, the penetration of moisture from the outside may be more effectively prevented while discharging the gas generated inside the secondary battery.

In one embodiment of the present disclosure, the lead film 400 may include a polyolefin-based resin. For example, the lead film 400 may include a polyolefin-based resin satisfying the gas permeability and/or moisture penetration amount values described above. The polyolefin-based resin may include at least one material selected from the group consisting of polypropylene, polyethylene, and polyvinyl difluoride (PVDF). While the lead film 400 contains polypropylene, the gas permeability of the lead film 400 may be 20 Barrer to 60 Barrer at 60° C. Also, the moisture penetration amount may be 0.06 g to 0.15 g. In this case, the gas generated inside the secondary battery may be more effectively discharged, and the penetration of moisture from the outside may be easily prevented.

In addition, since the lead film 400 is made of the above-described material, the lead film 400 may maintain the airtightness of the battery cell 100 and prevent leakage of the internal electrolytic solution.

The shape of the getter unit 500 is not particularly limited as long as the first end of the getter unit exposed to the outer side of the battery case 200 and not covered by the sealing portion 250 is formed to be covered by the lead film 400. Accordingly, the shape of the getter unit 500 may be appropriately changed to control durability and airtightness in consideration of the process environment.

Figure 5A:
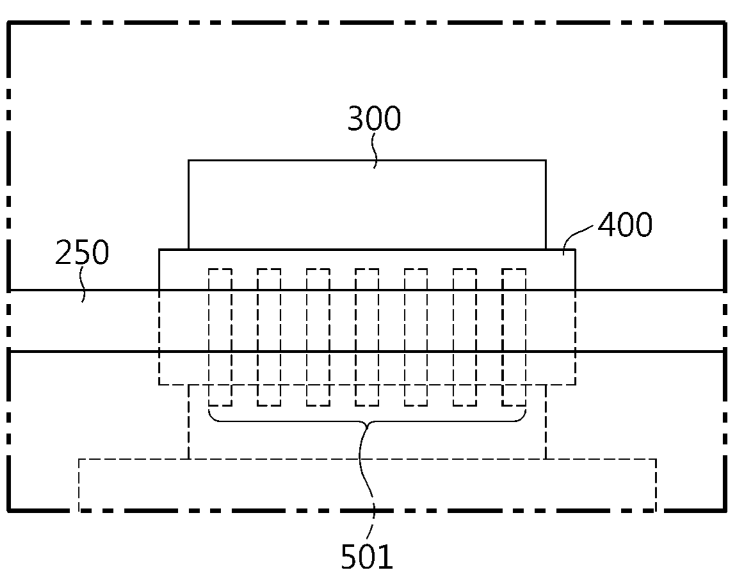
FIGS. 5*a* to 5*e* are partial top views showing battery cells according to modified examples of an embodiment of the present disclosure.
Figure 5B:
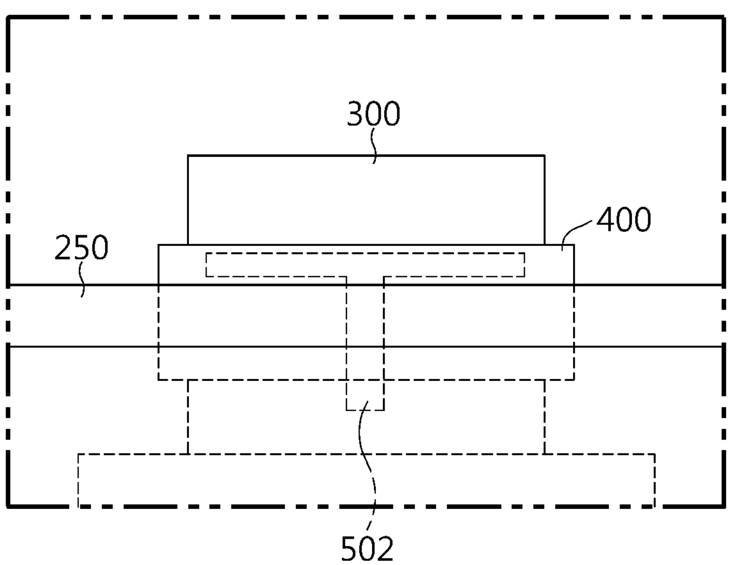
Figure 5C:
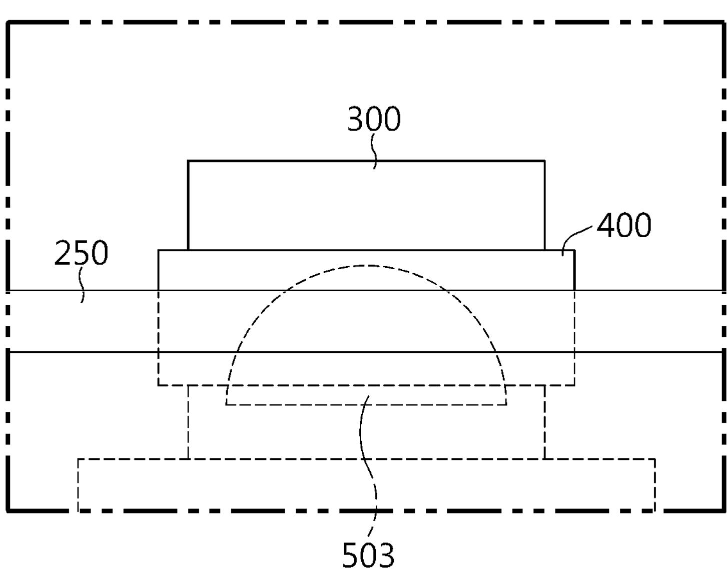
Figure 5D:
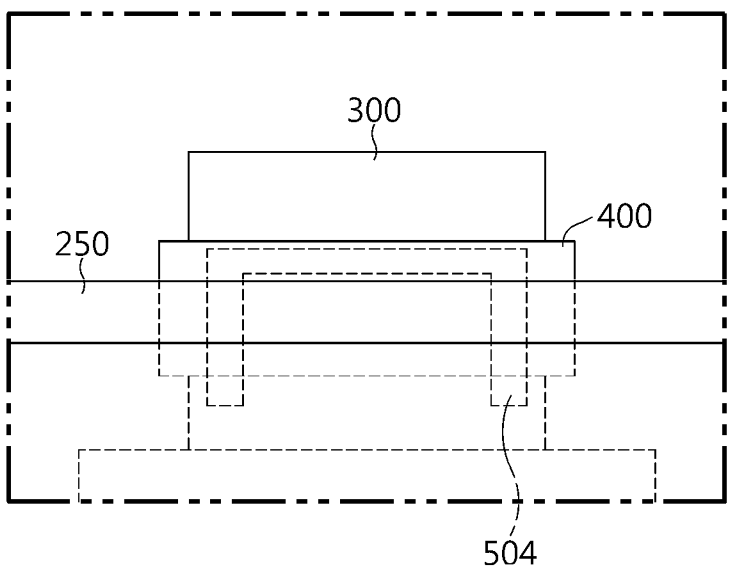
Figure 5E:
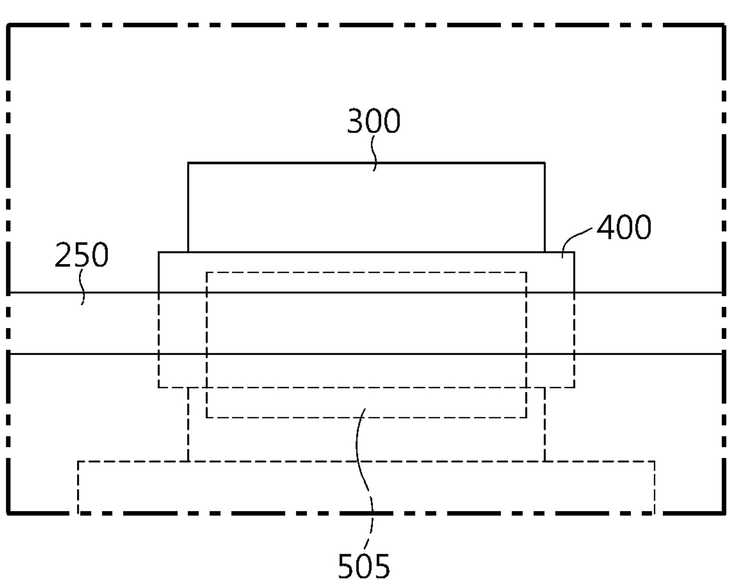

In modified examples of an embodiment of the present disclosure, as shown in FIGS. 5*a* to 5*e*, the shape of the getter unit 500 may be variously modified. That is, it is possible to form a getter unit of various shapes, such as a getter unit 501 having a stripe shape as in FIG. 5*a*, a getter unit 502 with a longer outer length as in FIG. 5*b*, a getter unit 503 having a semicircular shape as in FIG. 5*c*, a leg-type getter unit 504 as in FIG. 5*d*, and a getter unit 505 formed to have a large area as shown in FIG. 5*e*. Here, the "outer side" refers to a region of the getter unit that is not covered by the sealing portion, and "the length of the outer side" refers to a maximum value of a distance between one end and the other end of the getter unit 502 in a direction orthogonal to the protruding direction of the electrode lead 300.

Next, another embodiment of the present disclosure will be described with reference to FIG. 6.

Figure 6:
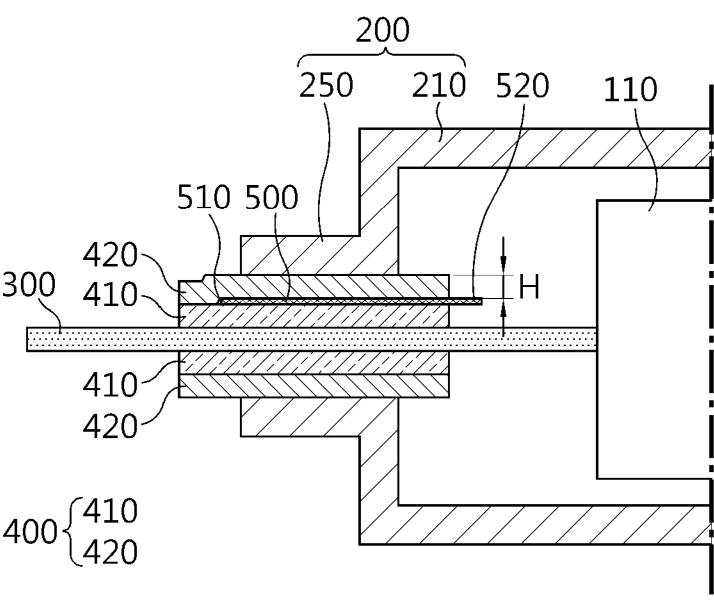
FIG. 6 is a cross-sectional view showing a battery cell according to another embodiment of the present disclosure.

FIG. 6 is a cross-sectional view showing a battery cell according to another embodiment of the present disclosure.

As shown in FIG. 6, in another embodiment of the present disclosure, the lead film 400 includes a first lead film 410 formed directly on the electrode lead 300, and a second lead film 420 formed on the first lead film 410 with the getter unit 500 interposed therebetween. This configuration may be obtained by coating the getter unit 500 on the electrode lead 300 on which the first lead film 410 is already formed, and then forming the second lead film 420. Therefore, it is possible to simply apply the getter unit 500 to a conventional electrode lead 300 to which the first lead film 410 is already attached.

Referring to FIG. 6, the thickness H of the second lead film 420 may be 100 μm to 300 μm, or 100 μm to 200 μm. If the thickness H of the second lead film 420 satisfies the above range, the gas inside the battery case 200 may be more easily discharged to the outside.

According to the embodiments of the present disclosure as above, the gas generated inside the battery case 200 may be easily discharged to the outside while maintaining the sealing force of the battery case 200. In particular, at this time, even if moisture penetrates from the outside through the passage through which gas is discharged, the moisture may be immediately removed by the getter unit 500, so it is possible to easily prevent moisture from being penetrated into the battery case 200. In addition, it is possible to implement the getter unit 500 just with a simple process of coating the getter resin on the electrode lead 300.

A battery module according to another embodiment of the present disclosure includes the battery cell described above. Meanwhile, one or more battery modules according to this embodiment may be packaged in a pack case to form a battery pack.

The battery module described above and the battery pack including the same may be applied to various devices. These devices may be transportation means such as electric bicycles, electric vehicles, hybrid electric vehicles, and the like, but the present disclosure is not limited thereto, and the present disclosure may be applied various devices that can use a battery module and a battery pack including the same, which is also within the scope of the right of the present disclosure.

Although the preferred embodiment of the present disclosure has been described in detail above, the scope of the right of the present disclosure is not limited thereto, and various modifications and improvements made by those skilled in the art using the basic concept of the present disclosure defined in the appended claims also fall within the scope of the right of the present disclosure.

What is claimed is:

1. A battery cell, comprising:

a battery case having an accommodation portion in which an electrode assembly is positioned, and a sealing portion formed by sealing an outer periphery of the battery case;

an electrode lead electrically connected to an electrode tab included in the electrode assembly, the electrode lead protruding out of the battery case through the sealing portion;

a lead film located on at least one of a first portion and a second portion of the electrode lead, the lead film adjacent to the sealing portion; and a getter unit positioned between the electrode lead and the sealing portion, wherein the getter unit includes a first end positioned outside of the battery case and a second end positioned inside of the battery case, the first end is covered by the lead film and not covered by the sealing portion, and wherein the getter unit is configured to discharge gas to an outside of the battery cell.

2. The battery cell according to claim 1, wherein the second end is not covered by the lead film and does not overlap with the sealing portion.

3. The battery cell according to claim 1, wherein the getter unit is formed directly on the electrode lead, and the lead film is disposed on the electrode lead with the getter unit interposed therebetween.

4. The battery cell according to claim 3, wherein the lead film located on the getter unit has a thickness of 100 μm to 300 μm.

5. The battery cell according to claim 1, wherein the lead film includes a first lead film contacting the electrode lead and a second lead film disposed on the first lead film with the getter unit interposed between the first lead film and the second lead film.

6. The battery cell according to claim 5, wherein the second lead film has a thickness of 100 μm to 300 μm.

7. The battery cell according to claim 1, wherein the getter unit includes at least one moisture-absorbing material selected from calcium oxide (CaO), barium oxide (BaO), lithium chloride (LiCl), silica ($SiO_2$), calcium (Ca) and barium (Ba).

8. The battery cell according to claim 7, wherein the getter unit contains a binder material including at least one selected from polyolefin-based polymers, acryl-based polymers and fluorine-based polymers.

9. The battery cell according to claim 1, wherein the lead film contains a polyolefin-based material.

10. The battery cell according to claim 1, wherein the lead film is configured to surround all of an upper portion of the electrode lead, a lower portion of the electrode lead, and a side surface connecting the upper portion and the lower portion of the electrode lead.

11. The battery cell according to claim 1, wherein the getter unit has a thickness of 50 μm to 150 μm.

12. The battery cell according to claim 1, wherein the getter unit has gas permeability of 1.6 $e^5$ Barrer to 1.6 $e^7$ Barrer.

13. The battery cell according to claim 1, wherein an area of the first end of the getter unit is greater than an area of the second end of the getter unit.

14. The battery cell according to claim 1, wherein a width between the first end and an outermost end of the lead film is 2 mm or more.

15. The battery cell according to claim 1, wherein the lead film has gas permeability of 20 Barrer to 60 Barrer at 60° C. and the lead film has a moisture penetration amount of 0.02 g to 0.2 g for 10 years at 25° C., 50% RH.

16. A battery module, comprising the battery cell according to claim 1.

17. A method for manufacturing a battery cell, comprising:

preparing an electrode assembly including an electrode lead electrically connected to an electrode tab;

positioning the electrode assembly in an accommodation portion of a battery case so that the electrode lead protrudes from the battery case; and sealing an outer periphery of the battery case to form a sealing portion, wherein the step of preparing the electrode assembly includes:

attaching a lead film to the electrode lead to be located adjacent to the sealing portion in at least one of a first portion and a second portion of the electrode lead, and coating a getter resin on the electrode lead to form a getter unit, wherein the getter unit includes a first end positioned outside of the battery case and a second end positioned inside of the battery case, wherein the first end is covered by the lead film and not covered by the sealing portion, and wherein the getter unit is configured to discharge gas to an outside of the battery cell.

18. The method for manufacturing a battery cell according to claim 17, wherein the getter resin includes:

at least one moisture-absorbing material selected from calcium oxide (CaO), barium oxide (BaO), lithium chloride (LiCl), silica ($SiO_2$), calcium (Ca) and barium (Ba); and a binder material including at least one selected from polyolefin-based polymers, acryl-based polymers and fluorine-based polymers.

19. The method for manufacturing a battery cell according to claim 17, wherein the second end is not covered by the lead film and does not overlap with the sealing portion.

* * * * *